United States Patent
Onogi et al.

(10) Patent No.: US 7,354,320 B2
(45) Date of Patent: Apr. 8, 2008

(54) WIRING CONNECTION STRUCTURE FOR BICYCLE

(75) Inventors: Takumi Onogi, Higashi-Osaka (JP); Hiroyuki Miyoshi, Suita (JP)

(73) Assignee: Shimano Inc., Sakai, Osaka (JP)

( * ) Notice: Subject to any disclaimer, the term of this patent is extended or adjusted under 35 U.S.C. 154(b) by 0 days.

(21) Appl. No.: 11/363,862

(22) Filed: Feb. 27, 2006

(65) Prior Publication Data

US 2006/0211282 A1    Sep. 21, 2006

(30) Foreign Application Priority Data

Mar. 1, 2005    (JP) ............................. 2005-055516

(51) Int. Cl.
 *H01R 11/22* (2006.01)
(52) U.S. Cl. .................... 439/851; 280/288.4; 439/932
(58) Field of Classification Search ................ 439/851, 439/34; 280/288.4, 205
See application file for complete search history.

(56) References Cited

U.S. PATENT DOCUMENTS

| | | | | |
|---|---|---|---|---|
| 4,541,145 A | * | 9/1985 | Sato et al. ...................... 24/19 |
| 5,267,869 A | * | 12/1993 | Nadasky et al. ............ 439/125 |
| 5,370,412 A | * | 12/1994 | Chou ...................... 280/288.4 |
| 5,628,656 A | * | 5/1997 | Macioce et al. ............ 439/851 |
| 6,017,989 A | * | 1/2000 | Malm et al. ................ 524/440 |
| 6,104,099 A | * | 8/2000 | Mizuta et al. ............... 307/9.1 |
| 6,454,598 B1 | * | 9/2002 | Burwell et al. ............ 439/523 |
| 6,523,772 B2 | * | 2/2003 | Ueno ..................... 242/400.1 |
| 6,983,949 B2 | * | 1/2006 | Ueno et al. ................. 280/279 |
| 2004/0115962 A1 | * | 6/2004 | Kitamura et al. ............ 439/34 |
| 2005/0258617 A1 | * | 11/2005 | Ueno et al. ................. 280/280 |

\* cited by examiner

*Primary Examiner*—Neil Abrams
*Assistant Examiner*—Phuongchi Nguyen
(74) *Attorney, Agent, or Firm*—Jeffer Mangels; Butler & Marmaro LLP

(57) ABSTRACT

There is provided a wiring connection structure for electrically connecting two electrical components that is easily made waterproof and can prevent poor insulation or falling off of a wiring. The wiring connection structure 60 for a bicycle is a structure for electrically connecting a first electrical wiring 50 connected to a switch unit 23*a* mounted to a handlebar 15 and a second electrical wiring 51 connected to a second control unit 31, and includes a first connection terminal 61, a second connection terminal 62, and a tubular cover member 63. The first connection terminal 61 is a terminal electrically connectable to the first electrical wiring 50. The second connection terminal 62 is a terminal electrically connectable to the second electrical wiring 51 and the first connection terminal 61. The cover member 63 is a heat-shrinkable synthetic resin member covering at least both the connection terminals 61 and 62.

7 Claims, 6 Drawing Sheets

WIRING CONNECTION STRUCTURE FOR BICYCLE

FIELD OF THE INVENTION

The present invention relates to a wiring connection structure, and more particularly to a wiring connection structure for a bicycle for electrically connecting a first electrical wiring connected to a first electrical component mounted to a frame of the bicycle including a handle and a second electrical wiring mounted to a second electrical component.

BACKGROUND OF THE INVENTION

Recent bicycles have incorporated many electrical components besides a lamp. For example, electrical components such as an electric drive force assist device for assisting a drive force from pedals or an electric shift device for electrically or pneumatically performing a shift operation have been widely used. Many electrical components for controlling or operating these electrical components have been also used. In a conventional wiring connection structure for connecting these electrical components, terminals attached to electric wirings are connected to a connection terminal mount provided in an electrical component by screws or male and female fitting (for example, see Japanese Patent Laid-Open No. 2004-159490 (FIGS. 5 and 7)). In the conventional wiring connection structure, the electrical wiring is placed in an exposed manner along a frame, and connects, for example, a shift switch provided in a handle and a display portion, or the display portion and a control portion provided in the middle of the frame.

In the conventional wiring connection structure, the electrical wiring is connected to the connection terminal mount provided in the electrical component, and thus it is difficult to make the structure waterproof. Thus, in the conventional wiring connection structure, the terminal mount may be exposed to the outside to cause poor insulation or falling off of the wiring resulting from corrosion by moisture.

Also, in the conventional wiring connection structure, the electrical wiring is placed in the exposed manner along the frame, and thus the electrical wiring may be caught by an obstacle to be cut or damaged. In order to prevent this from happening, it is supposed that the electrical wiring is inserted into the frame. However, it is difficult to insert the electrical wiring connected to the terminal mount outside the frame into the frame.

SUMMARY OF THE INVENTION

An object of the present invention is to provide a wiring connection structure for electrically connecting two electrical components that is easily made waterproof and can prevent poor insulation or falling off of a wiring.

Another object of the present invention is to provide a wiring connection structure for electrically connecting two electrical components that facilitates insertion of a wiring into a frame.

In accordance with a first aspect of the present invention, there is provided a wiring connection structure for a bicycle for electrically connecting a first electrical wiring connected to a first electrical component mounted to a frame of the bicycle including a handle and a second electrical wiring connected to a second electrical component. The wiring connection structure includes: a first connection terminal; a second connection terminal; and a tubular cover member.

The first connection terminal is a terminal electrically connectable to the first electrical wiring. The second connection terminal is a terminal electrically connectable to the second electrical wiring and the first connection terminal. The cover member is a heat-shrinkable synthetic resin member covering at least both the connection terminals.

In the wiring connection structure, with the first electrical wiring being previously connected to the first electrical component and the second electrical wiring being previously connected to the second electrical component, the first electrical wiring is connected to the first connection terminal and the second electrical wiring is connected to the second connection terminal. Then, with both the terminals being connected, the cover member covers at least both the connection terminals, preferably both the connection terminals and part of the electrical wirings connected thereto, then cover member is heated. Thus, the cover member shrinks along the shape of both the connection terminals connected, covers both the connection terminals, and comes into contact with both the connection terminals and both the electrical wirings. This prevents both the connection terminals from being detached, and prevents a liquid from entering the connection terminals, thereby achieving waterproof effect. Also, both the connection terminals are insulated and become nonconductive even if the connection terminals come into contact with a conductive member. Here, the heat-shrinkable synthetic resin cover member covers at least both the connection terminals, and thus both the connection terminals connected are covered with the cover member and heated to allow the cover member to shrink along the shape of both the connection terminals. This facilitates providing a waterproof structure and prevents poor insulation or falling off of the wirings.

The first and second electrical wirings are previously connected to the first and second electrical components, and then the first and second electrical wirings are drawn out of the frame from positions to which the electrical components are mounted through the inside of the frame, the two electrical wirings drawn out are connected using the first and second connection terminals and then accommodated in the frame, thereby facilitating the insertion of the electrical wirings into the frame. At this time, both the connection terminals are covered with the heat-shrinking synthetic resin cover member, thereby maintaining insulation and waterproof properties and preventing the connection terminals or the wirings from being detached.

In preferred embodiments, the first connection terminal includes a first crimp portion to which the first electrical wiring can be crimped, and a first connection portion placed next to the first crimp portion and connectable to the second connection terminal by male and female fitting, the second connection terminal includes a second crimp portion to which the second electrical wiring can be crimped, and a second connection portion placed next to the second crimp portion and connectable to the first connection terminal by male and female fitting, and the cover member has sufficient length to cover at least the first and second crimp portions and the first and second connection portions with both the connection terminals being connected. In this case, the two connection terminals constituted by crimp terminals to which the electrical wirings are crimped are reliably covered with the cover member, and part of the electrical wirings are also covered with the cover member to further improve the waterproof property.

In other preferred embodiments, the first and second connection terminals and the cover member can be accommodated in the frame. In this case, all components can be accommodated in the frame, and thus both the electrical wirings can be inserted into the frame from the positions to which the electrical components are mounted, drawn out of the frame and connected using both the connection terminals, and then accommodated in the frame, thereby facilitating the insertion of the electrical wirings into the frame.

In still other preferred embodiments, the first electrical component is a shift operation portion having a shift operation switch mounted to the handle, the second electrical component is a shift control portion that outputs a shift signal to a shift device by an on/off operation of the switch mounted to the handle, and the first and second connection terminals and the cover member can be accommodated in the handle. In this case, the shift operation portion as the first electrical component and the shift control portion as the second electrical component can be easily connected in the handle.

In further preferred embodiments, the cover member is made of transparent polyolefin resin. In this case, the polyolefin resin that is relatively low in cost and versatile is used to cover both the connection terminals at low costs.

According to preferred embodiments, the heat-shrinkable synthetic resin cover member covers at least both the connection terminals, and thus both the connection terminals connected are covered with the cover member and heated to allow the cover member to shrink along the shape of both the connection terminals. This facilitates providing a waterproof structure and prevents poor insulation or falling off of the wirings.

The first and second electrical wirings are previously connected to the first and second electrical components, and then drawn out of the frame from the positions to which the electrical components are mounted through the inside of the frame, the two electrical wirings drawn out are connected using the first and second connection terminals and then accommodated in the frame, thereby facilitating the insertion of the electrical wirings into the frame. At this time, both the connection terminals are covered with the heat-shrinking synthetic resin cover member, thereby maintaining insulation and waterproof properties and preventing the connection terminals or the wirings from being detached.

Figure 1:
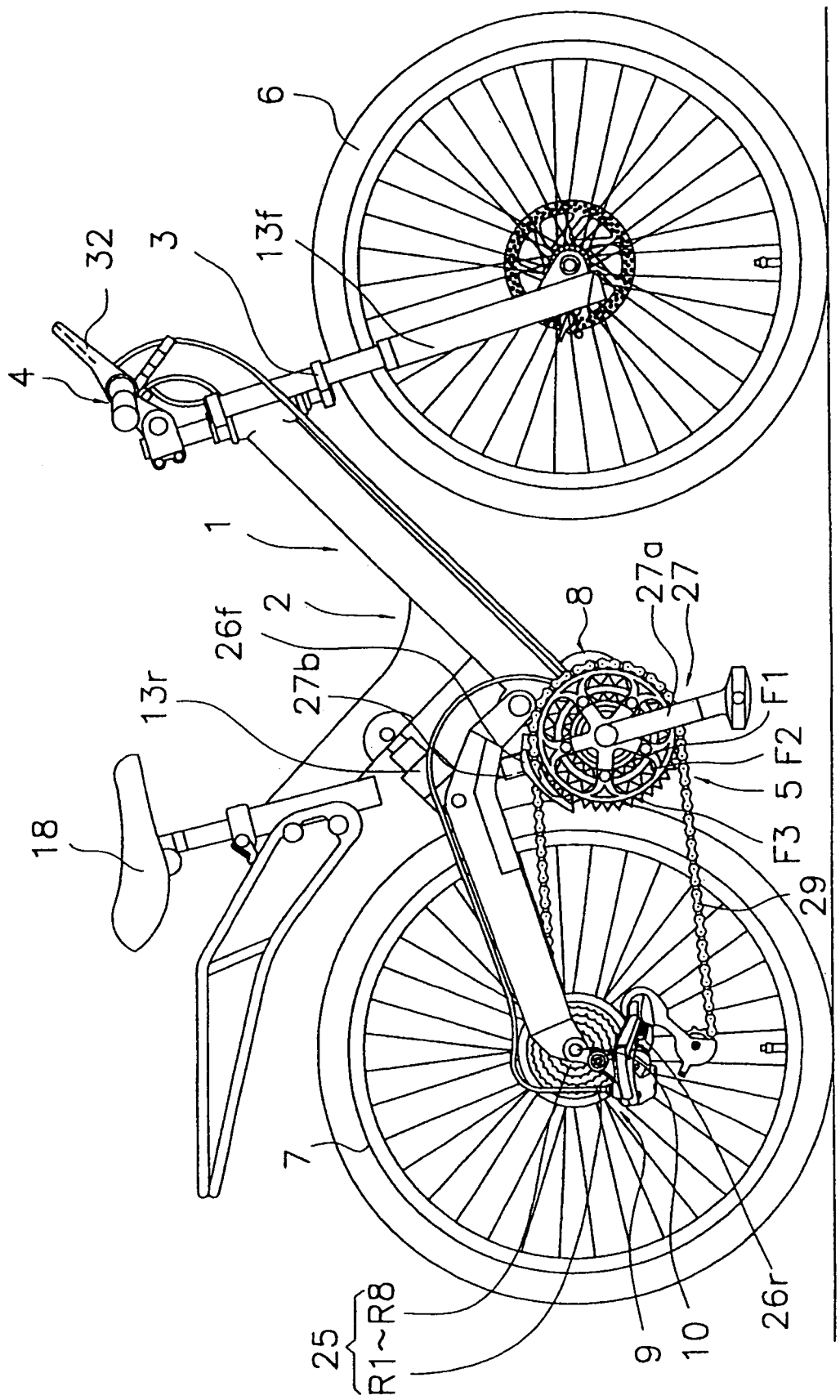
FIG. 1 is a side view of a bicycle using an embodiment of the present invention.

DESCRIPTION OF SYMBOLS 1 frame
4 handle portion (an example of a handle)
11 control device (an example of a second electrical component)
15 handlebar (an example of a configuration of a handle)
23a switch unit (an example of a first electrical component)
31 second control unit (an example of a configuration of a second electrical component)
50 first connection wiring
51 second connection wiring
60 wiring connection structure
61 first connection terminal
62 second connection terminal
63 cover member

DETAILED DESCRIPTION OF THE PREFERRED EMBODIMENTS

In FIG. 1, a bicycle adopting an embodiment of the present invention is a mountain bike with front and rear suspensions, and includes a frame 1 having a frame body 2 with a rear suspension 13r, a front fork 3 with a front suspension 13f, and a handle portion 4 (an example of a handle), a drive portion 5 including front and rear shift devices 8 and 9, a front wheel 6 mounted to the front fork 3, a rear wheel 7 to which a hub dynamo 10 is mounted, and a control device 11 (FIG. 3) for controlling portions including the front and rear shift devices 8 and 9.

The frame body 2 of the frame 1 is created by welding an odd-form rectangular pipe. Portions including a saddle 18 and the drive portion 5 are mounted to the frame body 2. The front fork 3 is oscillably mounted around a tilted shaft in front of the frame body 2.

Figure 2:
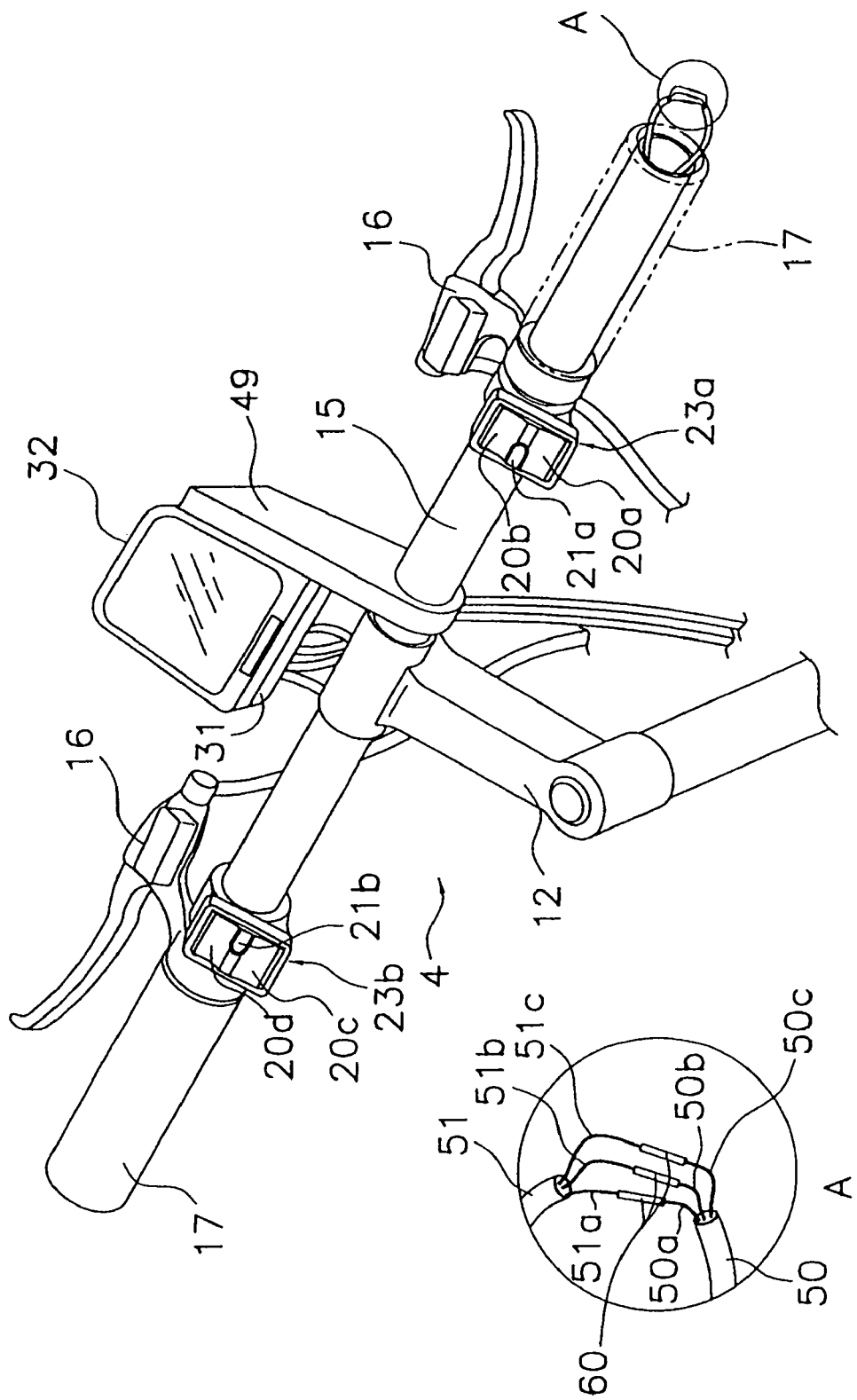
FIG. 2 is an enlarged perspective view of a handle portion thereof.

As shown in FIG. 2, the handle portion 4 includes a handle stem 12 secured to an upper portion of the front fork 3, and a handlebar 15 secured to the handle stem 12. Brake levers 16 and grips 17 are mounted to opposite ends of the handlebar 15. A switch unit (an example of a first electrical component) 23a having rear shift switches 20a and 20b for a manual shift operation of the rear shift device 9 and an operation switch 21a for switching an operation mode between an automatic shift mode and a manual shift mode, and a switch unit (an example of the first electrical component) 23b having front shift switches 20c and 20d for a manual shift operation of the front shift device 8 and an operation switch 21b for manually switching the degree of stiffness of the suspensions 13f and 13r are mounted to the inside of portions to which the brake levers 16 are mounted. The shift switch 20a is a switch for shifting down a rear derailleur 26r described later stepwise in a manual shift mode, and the shift switch 20b is a switch for shifting up the rear derailleur 26r stepwise. The shift switch 20c is a switch for shifting down a front derailleur 26f described later stepwise in the manual shift mode, and the shift switch 20d is a switch for shifting up the front derailleur 26f stepwise.

The drive portion 5 has a crank 27 provided in a lower portion (a hanger portion) of the frame body 2, and the externally mounted front and rear shift devices 8 and 9. The front shift device 8 has three sprockets F1 to F3 mounted to the crank 27 and the front derailleur 26f mounted to the frame body 2. The rear shift device 9 has a multistage gear 25 having, for example, eight sprockets R1 to R8, and the rear derailleur 26r mounted to a rear portion of the frame body 2. The crank 27 has a gear crank 27a to which the three sprockets F1 to F3 are mounted and a left crank 27b. The drive portion 5 has a chain 29 wound around any of the sprockets F1 to F3 and R1 to R8 of the gear crank 27a and the multistage gear 25.

For the sprockets F1 to F3 on the front side, the number of teeth is successively increased from the sprocket F1 having the smallest number of teeth, and the sprocket F3 having the largest number of teeth is placed on the outermost side. For the sprockets R1 to R8 on the rear side, the number of teeth is successively decreased from the sprocket R1 having the largest number of teeth, and the sprocket R8 having the smallest number of teeth is placed on the outermost side. In FIG. 1, the number of sprockets R1 to R8 are not precisely shown for simplicity of the drawing.

A rotation detector (not shown) for detecting a rotation of the crank 27 is mounted to the center of rotation on the side of the left crank 27b. The rotation detector has a reed switch 24 (FIG. 3) and a magnet (not shown) spaced in a rotation direction of the crank 27 on the side of the center of rotation of the reed switch 24, and four pulses are output from the reed switch 24 for each rotation of the crank 27. The rotation detector is provided so that a shift operation is performed only when the crank 27 rotates because the externally mounted shift device cannot be shifted without the rotation of the crank 27.

The hub dynamo 10 of the rear wheel 7 is a hub to which a brake disk of a disc brake and a freewheel to which the multistage gear 25 is mounted can be mounted, and has an AC generator 19 (FIG. 3) therein that generates electric power by rotation of the rear wheel 7.

The control device 11 controls the shift devices 8 and 9 and the suspensions 13f and 13r according to the operations of the shift switches 20a to 20d and the operation switches 21a and 21b, and automatically controls them according to the speed.

Figure 3:
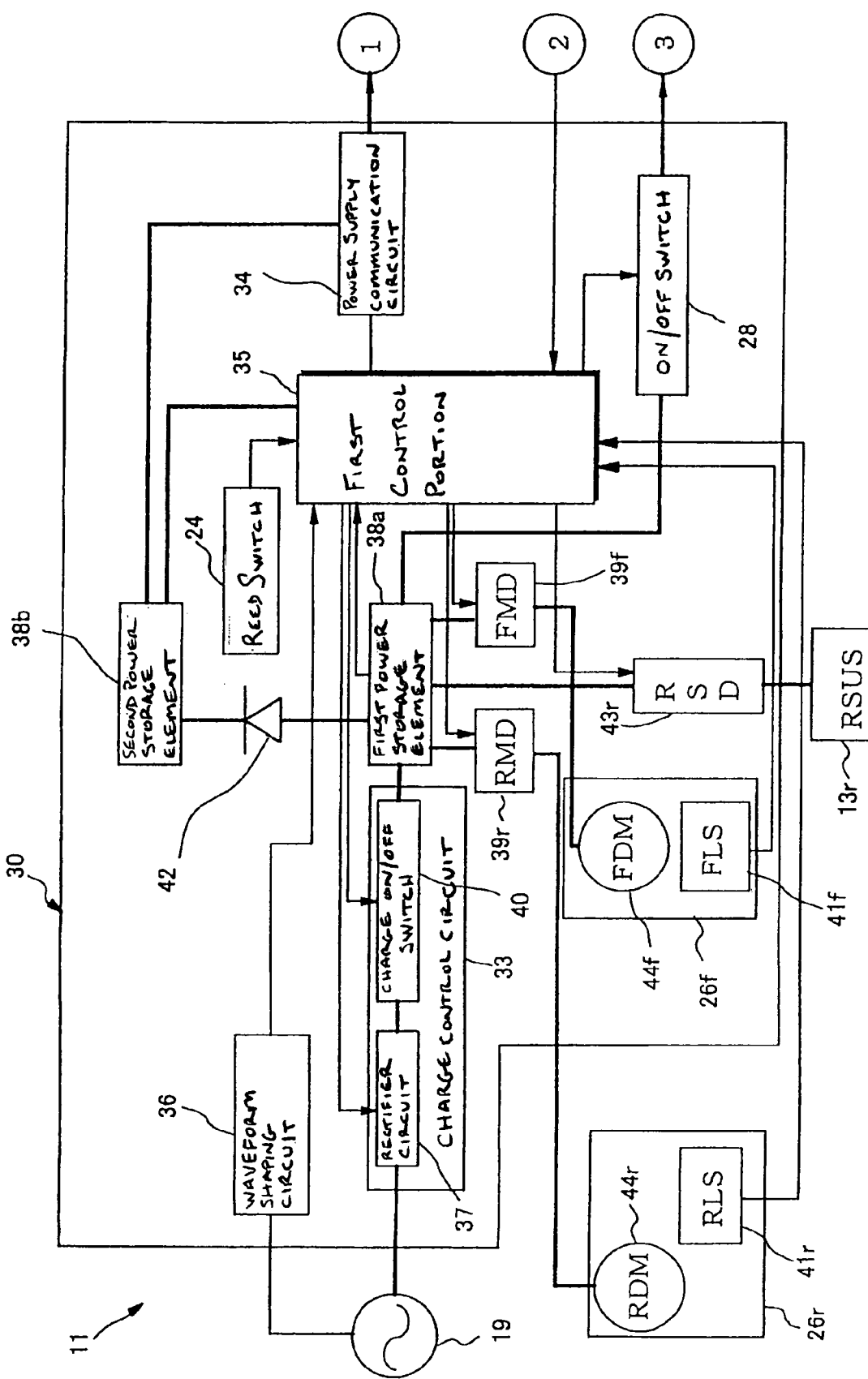
FIG. 3 is a block diagram of part of a configuration of a control device.
Figure 4:
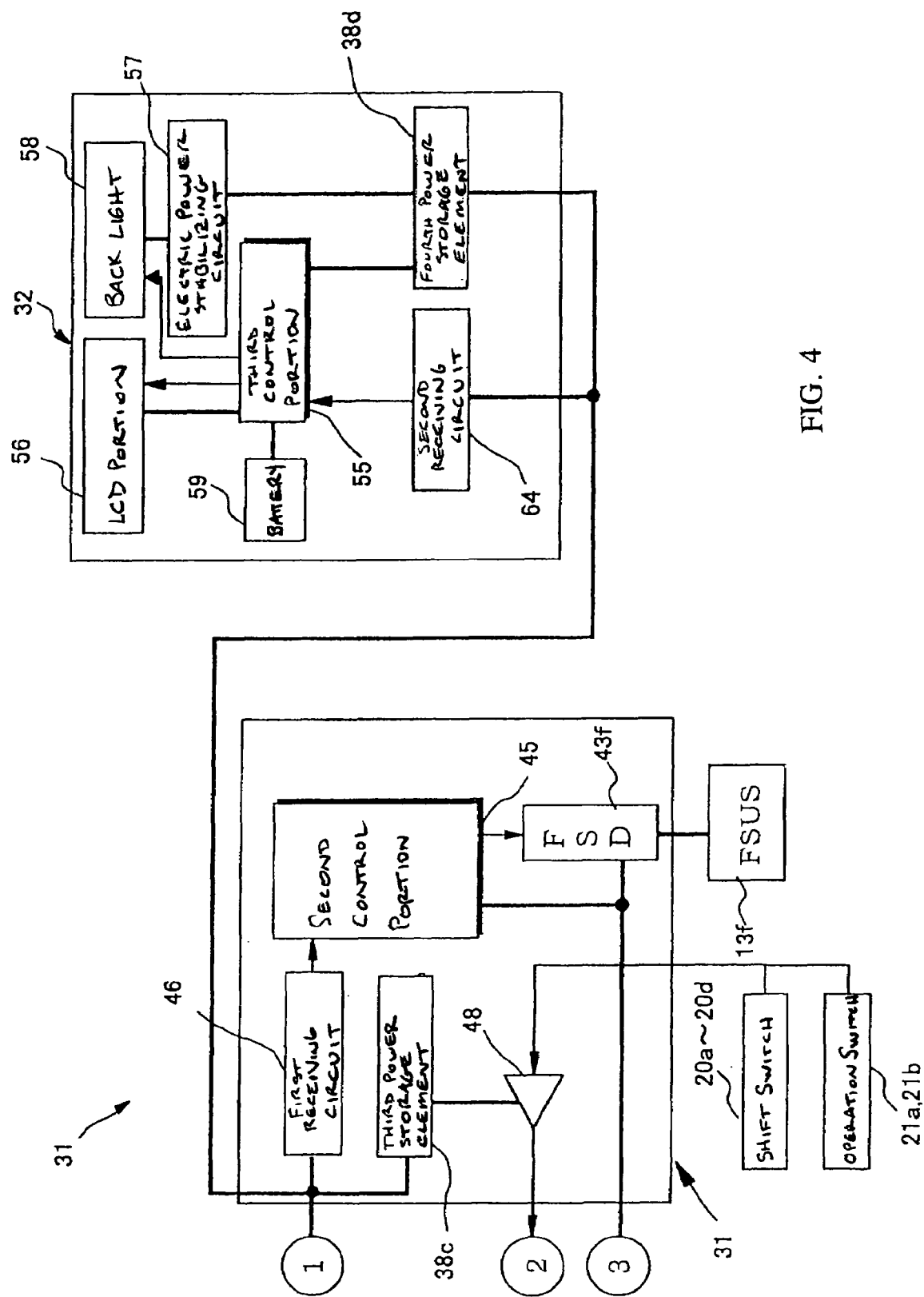
FIG. 4 is a block diagram of the remaining part of the configuration of the control device.

As shown in FIGS. 3 and 4, the control device 11 (an example of a second electrical component) has three control units: first, second, and third control units 30 to 32. The first control unit 30 is connected to the AC generator 19. The first control unit 30 is driven by electric power generated by the AC generator 19, and controls the front derailleur 26f, the rear derailleur 26r, and the rear suspension 13r with the supplied electric power. The first control unit 30 is connected to the second control unit 31, and supplies a control signal on the electric power to the second control unit 31 or the third control unit 32. Specifically, the supplied electric power is turned on/off according to the control signal to output the control signal on the electric power.

The second control unit 31 controls the front suspension 13f according to a control signal sent from the first control unit 30, and mediates operation information of the switches 20a to 20d, 21a, and 21b to the first control unit 30.

The third control unit 32 is detachably mounted to the second control unit 31. The third control unit 32 has a liquid crystal display portion 56 that can display traveling information, and controls the display on the liquid crystal display portion 56 according to the control signal output from the first control unit 30. The liquid crystal display portion 56 displays traveling information such as a vehicle speed, a traveling distance, or a shift position.

The first control unit 30 is mounted to, for example, the hanger portion in the lower portion of the frame body 2, and provided adjacent to the rotation detector and the front derailleur 26f. The first control unit 30 controls the shift devices 8 and 9 and the rear suspension 13r according to the operation mode. Specifically, in the automatic mode, the first control unit 30 controls the shift of the shift devices 8 and 9 according to the speed and the degree of stiffness of the rear suspension 13r between high and low according to the speed. In the manual mode, the first control unit 30 controls the shift devices 8 and 9 and the rear suspension 13r according to operations of the shift switches 20a to 20d and the operation switch 21b. Also, a speed signal is output to the second control unit 31 and the third control unit 32 as a control signal.

The first control unit 30 has a first control portion 35 constituted by a microcomputer including a CPU, a memory, an I/O interface, or the like. A waveform shaping circuit 36 for generating a speed signal according to a pulse output from the AC generator 19, a charge control circuit 33, a first power storage element 38a, a reed switch 24 of the rotation detector, a power supply communication circuit 34, and a power on/off switch 28 are connected to the first control portion 35. A motor driver (FMD) 39f of the front derailleur 26f, a motor driver (RMD) 39r of the rear derailleur 26r, an operation position sensor (FLS) 41f of the front derailleur 26f, an operation position sensor (RLS) 41r of the rear derailleur 26r, and a motor driver (RSD) 43r of the rear suspension 13r are also connected to the first control portion 35.

Traveling data such as various traveling information and control data required for control are stored in the memory in the first control portion 35. Electric power from a second power storage element 38b connected to the first power storage element 38a via a diode 42 is supplied to the first control portion 35. The diode 42 is provided to pass an electric current in one direction only from the first power storage element 38a to the second power storage element 38b. This prevents backflow from the second power storage element 38b to the first power storage element 38a. The first power storage element 38a is mainly used as power supply for electrical equipment having high power consumption and large electric capacity such as the motor drivers 39f, 39r, 43f, and 43r, or the suspensions 13f and 13r or the derailleurs 26f and 26r having motors driven by the motor drivers 39f, 39r, 43f, and 43r. The first power storage element 38a is also used as power supply for a second control portion 45 described later: The second power storage element 38b is used as power supply for electrical equipment having low power consumption and small electric capacity such as the first control portion 35, a third control portion 55 described later, or the liquid crystal display portion 56.

The first and second power storage elements 38a and 38b are constituted by large capacity capacitors such as electric double layer capacitors, and store DC power output from the AC generator 19 and rectified by the charge control circuit 33. The power storage elements 38a and 38b may be constituted by secondary batteries such as nickel-cadmium batteries, lithium ion batteries, or nickel hydrogen batteries, instead of the capacitors.

The charge control circuit 33 includes a rectifier circuit 37 that rectifies the electric power output from the AC generator 19 and generates the DC power, and a charge on/off switch 40 for turning on/off the electric power output from the rectifier circuit 37 according to a voltage signal from the first control portion 35. The charge on/off switch 40 is for preventing the first power storage element 38a from storing electric power of an excessive voltage. The voltage of the first power storage element 38a is monitored by the first control portion 35, and the first control portion 35 outputs a voltage signal for turning off the charge on/off switch 40 when the monitored voltage reaches a predetermined voltage (for example, 7 volt) or more to open the charge on/off switch 40. The first control portion 35 outputs a voltage signal for turning on the charge on/off switch 40 when the monitored voltage reaches a predetermined voltage (for example, 5.5 volt) or less to close the charge on/off switch 40.

The power supply communication circuit 34 is also connected to the second power storage element 38b. The power supply communication circuit 34 turns on/off electric power supplied from the second power storage element 38b according to a control signal depending on information from the first control portion 35 on a speed, a distance, a shift stage, an automatic or manual operation, or the degree of stiffness of the suspension to supply electric power including the control signal to the second control unit 31.

The power on/off switch 28 is also connected to the first power storage element 38a. The power on/off switch 28 is provided to turn on/off the electric power supplied from the first power storage element 38a to the motor driver 43f of the front suspension 13f and the second control unit 31. The power on/off switch 28 is turned off by a signal from the first control portion 35 when control of the degree of stiffness of the front and rear suspensions 13f and 13r is finished, and turned on when the control is started. This prevents unnecessary consumption of electric power by the first power storage element 38a.

The motor drivers 39f, 39r, 43f, and 43r output drive signals for driving the motors 44f and 44r provided in the derailleurs 26f and 26r and the motors (not shown) provided in the suspensions 13f and 13r to the motors according to the control signal.

As shown in FIG. 2, the second control unit 31 is mounted by a bracket 49 securable to the handlebar 15 of the handle portion 4. The second control unit 31 has the second control portion 45 constituted by the microcomputer as shown in FIG. 4. A first receiving circuit 46 and the motor driver (FSD) 43f of the front suspension 13f are connected to the second control portion 45. The first receiving circuit 46 is connected to the power supply communication circuit 34 of the first control unit 30, and extracts the control signal included in the electric power and output the signal to the second control portion 45. The power supply communication circuit 34 is also connected to the third power storage element 38c. The third power storage element 38c uses a relatively small capacity capacitor such as an electrolytic capacitor, and is provided to smooth the electric power turned on/off according to the control signal. A buffer amplifier 48 is connected to the third power storage element 38c. The buffer amplifier 48 is an amplifier that can maintain an input/output voltage at a constant level, and is provided to stabilize an analog voltage signal from the shift switches 20a and 20b and the operation switches 21a and 21b.

The second control unit 31 is operated by the electric power from the first power storage element 38a, and controls the front suspension 13f according to the operation mode based on the control signal on the electric power of the second power storage element 38b. Specifically, in the automatic mode, the second control unit 31 switches the degree of stiffness of the front suspension 13f according to the speed, and in the manual shift mode, the second control unit 31 switches the degree of stiffness of the front suspension 13f according to the operation of the operation switch 21b. As described above, the second control portion 45 is operated by the power on/off switch 28 only when the suspension is controlled.

The third control unit 32 is a so-called cycle computer, and is detachably mounted to the second control unit 31. A battery 59 such as a button battery is mounted to the third control unit 32 so that electric power can be also supplied from the battery 59. This allows the third control unit 32 to be operated even if the third control unit 32 is detached from the second control unit 31. Thus, various initial setting such as setting of a wheel diameter can be performed and various data such as a traveling distance or a traveling time can be stored.

As shown in FIG. 4, the third control unit 32 has the third control portion 55 constituted by the microcomputer. The liquid crystal display portion 56, a back light 58, the battery 59, a second receiving circuit 64, and a fourth power storage element 38d are connected to the third control portion 55. The liquid crystal display portion 56 can display various traveling information such as a speed, cadence, a traveling distance, a shift position, or the state of suspensions, and is illuminated by the back light 58. An electric power stabilizing circuit 57 stabilizes electric power including an on/off signal by, for example, smoothing even if the electric power is turned on/off to supply the control signal. This prevents flickering of the back light 58 even if the on/off control signal is on the electric power.

The second receiving circuit 64 is connected in parallel with the first receiving circuit 46, and extract a control signal included in the electric power from the second power storage element 38b and outputs the signal to the third control portion 55. The fourth power storage element 38d is constituted by, for example, an electrolytic capacitor, and provided to store the electric power supplied from the second power storage element 38b to reduce influence of the on/off control signal. The fourth power storage element 38d is connected in parallel with the second receiving circuit 64 and connected to the third control portion 55 and the electric power stabilizing circuit 57.

For the control device 11 having such a configuration, the AC generator 19 of the hub dynamo 10 generates electric power when the bicycle travels, the electric power is fed to the first control unit 30 and stored in the first and second power storage elements 38a and 38b. The AC generator 19 is provided in the rear wheel 7, and thus the first and second power storage elements 38a and 38b can be charged by rotating pedals with a stand being raised, even if the amount of charge is insufficient. Thus, rotating the pedals for adjusting the shift device allows easy charging, and facilitates an operation such as setting of the liquid crystal display portion 56 even if the amount of charge is insufficient.

The first control unit 30 is provided in the hanger portion, and is close to the AC generator 19. Thus, a short power supply cable may be used to increase efficiency of transmission of signals and electric power supply.

When the operation switches 21a and 21b or the shift switches 20a to 20d are operated, a signal of a different analog voltage is output to the first control portion 35 via the buffer amplifier 48, and the first control portion 35 generates signals for controlling the derailleurs 26f and 26r, signals for controlling the suspensions 13f and 13, or a signal for changing the mode. Among the signals, the signal for controlling the front suspension 13f is output to the power supply communication circuit 34, turns on/off the electric power like the speed signal, and is output to the second control portion 45 to control the front suspension 13f in the second control portion 45.

As shown in an enlarged manner in a portion A in FIG. 2, a 3-wire first electrical wiring 50 is connected to the switch unit 23a. The first electrical wiring 50 is connected to the shift switches 20a and 20b and the operation switch 21a in the switch unit 23a. Specifically, a first cord 50a of the first electrical wiring 50 is connected to one end of the operation switch 21a, and a second cord 50b is connected to one ends of the shift switches 20a and 20b via resistances with different values. A third cord 50c is a common wire, and connected to the other ends of the operation switch 21a and the shift switches 20a and 20b. Such connection causes an analog signal according to the on/off operation of the operation switch 21a is output from the first cord 50a to the buffer amplifier 48, and a signal of a different analog voltage according to the on/off operation of the shift switches 20*a* and 20*b* is output from the second cord 50*c* to the buffer amplifier 48. The first electrical wiring 50 is inserted into the handlebar 15 via a through hole formed to pass from the switch unit 23*a* to the handlebar 15 through inner and outer peripheries and drawn out from an end surface of the handlebar 15. The same first electrical wiring is also connected to the switch unit 23*b*.

A second electrical wiring 51 electrically connected to the first electrical wiring 50 by a wiring connection structure 60 is connected to the second control unit 31 mounted to the bracket 49. The second electrical wiring 51 is also a 3-wire wiring and connected to the buffer amplifier 48.

Figure 5:
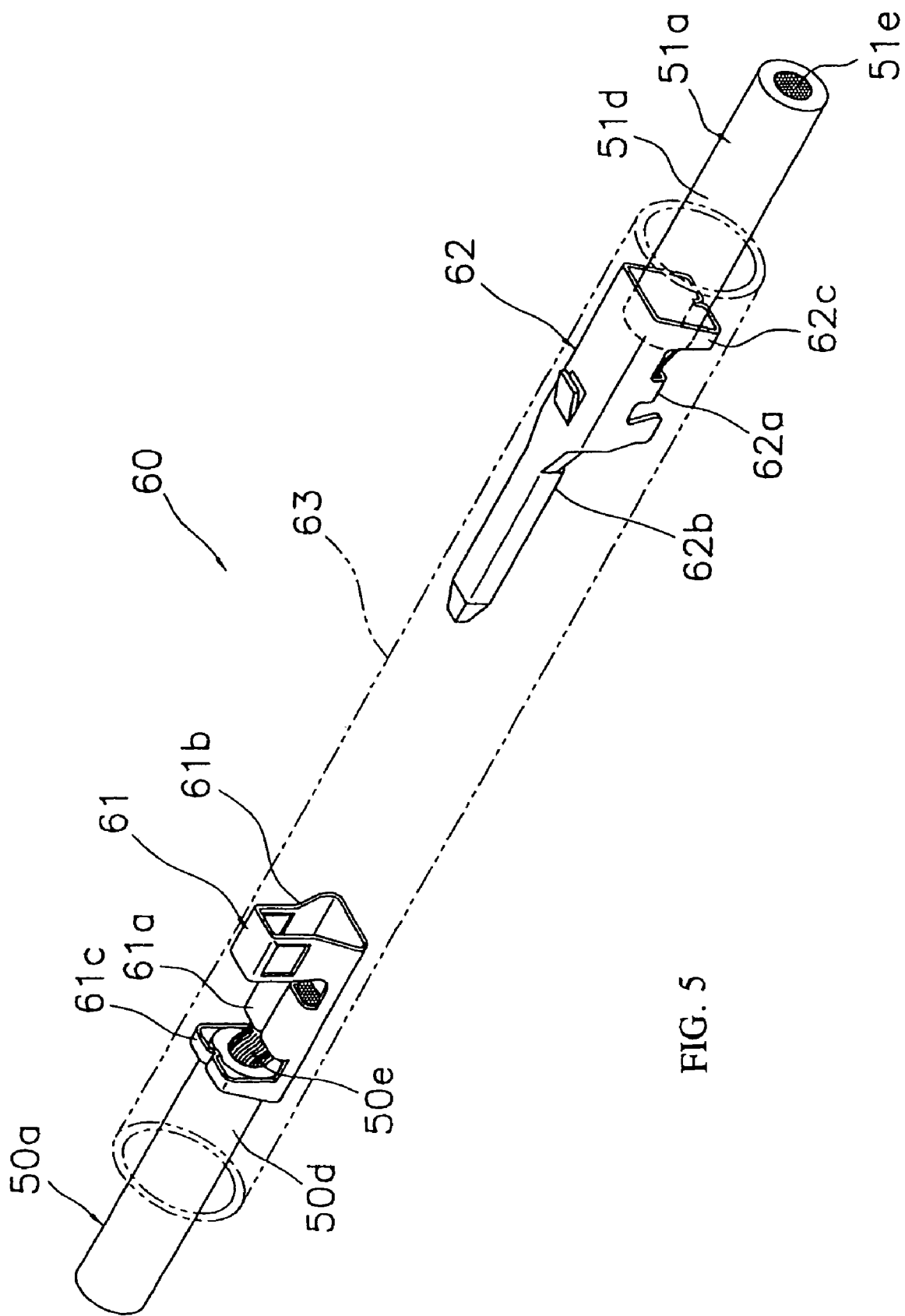
FIG. 5 is an exploded perspective view of a configuration of a wiring connection structure according to the present invention before connection.

The wiring connection structure 60 electrically connects the first electrical wiring 50 connected to the switch unit 23*a* mounted to the handlebar 15 and the second electrical wiring 51 connected to the second control unit 31. As shown in FIG. 5, the wiring connection structure 60 has a first connection terminal 61 electrically connectable to the cords 50*a*, 50*b*, and 50*c* of the first electrical wiring 50, a second connection terminal 62 electrically connectable to cords 51*a*, 51*b*, and 51*c* of the second electrical wiring 51 and the first connection terminal 61, and a heat-shrinkable synthetic resin tubular cover member 63 covering at least both the connection terminals 61 and 62. In FIG. 5, the wiring connection structure 60 is shown in which the first cord 50*a* of the first electrical wiring 50 and the first cord 51*a* of the second electrical wiring 51 are electrically connected, but other cords and a wiring connection structure connecting the cords have the same structures. As described above, the first electrical wiring and the second electrical wiring are connected to the switch unit 23*b* and the second control unit 31, and these electrical wirings are connected by a wiring connection structure 60 having the same configuration.

Both the connection terminals 61 and 62 are crimp terminals for male and female fitting, and in this embodiment, the first connection terminal 61 is a socket type (female) connection terminal, and the second connection terminal is a plug type (male) connection terminal. Both the connection terminals 61 and 62 are formed by press machining, for example, a phosphor bronze plate, and tinned.

The first connection terminal 61 has a first crimp portion 61*a* to which the first cord 50*a* of the first electrical wiring 50 can be crimped, a socket-shaped first connection portion 61*b* placed next to the first crimp portion 61*a* and connectable to the second connection terminal 62, and a first covering and securing portion 61*c* for securing a cover portion 50*d* of the first cord 50*a*. The first covering and securing portion 61*c* is placed next to the first crimp portion 61*a* on the opposite side to the first connection portion 61*b*. The first crimp portion 61*a* electrically connects a core wire 50*e* of the first cord 50*a* by folding a plate by a crimp tool.

The second connection terminal 62 includes a second crimp portion 62*a* to which the first cord 51*a* of the second electrical wiring 51 can be crimped, and a plug-shaped tapered second connection portion 62*b* placed next to the second crimp portion 62*a* and inserted into and electrically connectable to the first connection portion 61*b* of the first connection terminal 61, and a second covering and securing portion 62*c* for securing a cover portion 51*d* of the first cord 51*a*. The second covering and securing portion 62*c* is placed next to the second crimp portion 62*a* on the opposite side to the second connection portion 62*b*. The second crimp portion 62*a* electrically connects a core wire 51*e* of the first cord 51*a* by folding a plate by a crimp tool.

Figure 6:
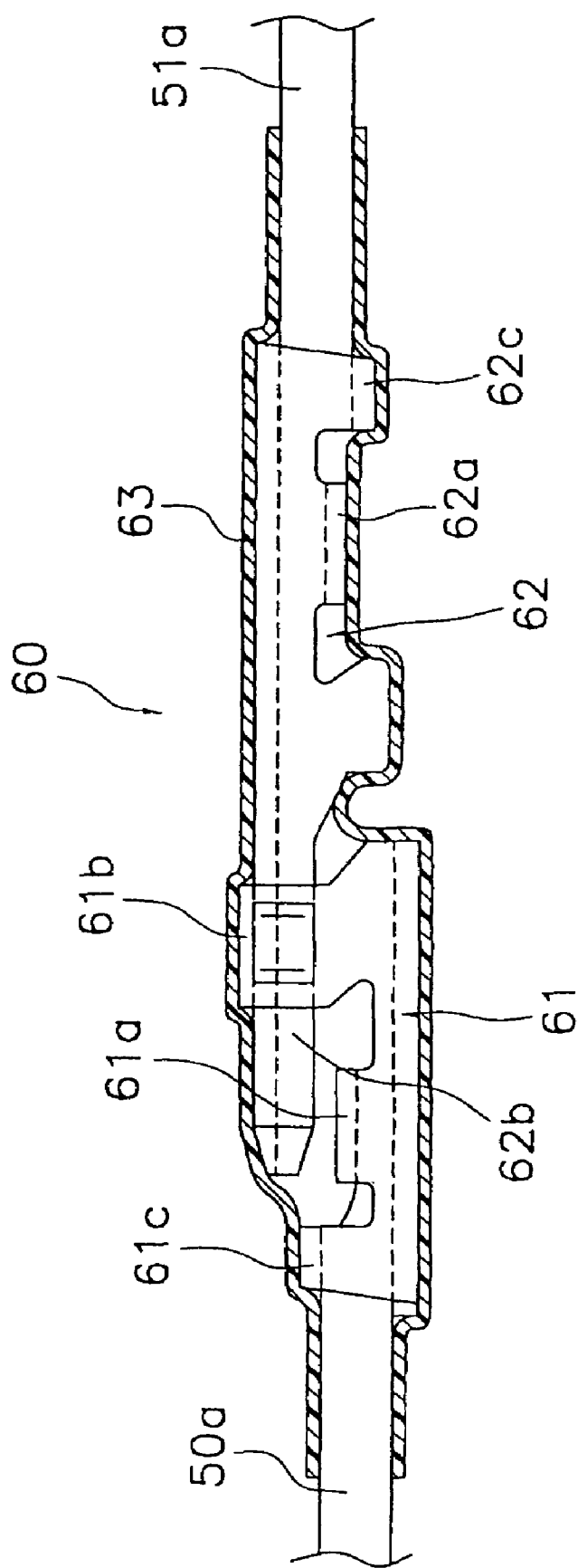
FIG. 6 is a side view, partially in section, of a connection state of the wiring connection structure.

The cover member 63 is, for example, a heat-shrinkable transparent polyolefin resin tube, and has sufficient length to cover the first and second crimp portions 61*a* and 62*a*, the first and second connection portions 61*b* and 62*b*, the first and second covering and securing portions 61*c* and 62*c*, and connection portions of, for example, about 2 mm to 20 mm of the first and second electrical wirings 50 and 51, with both the connection terminals being connected, as shown in FIG. 6. Blowing hot air at, for example, about 110° C. on the cover member 63 causes the cover member 63 to shrink with heat substantially along the shape of the connection terminals 61 and 62 and the cords 50*a* and 51*a* as shown in FIG. 6.

For connecting the first electrical wiring 50 and the second electrical wiring 51 with the wiring connection structure 60 thus configured, the following connection operation is performed.

First, through holes (not shown) through which the electrical wirings are inserted are previously bored in an outer peripheral surface of the handlebar 15 near portions to which the second control unit 31 and the switch units 23*a* and 23*b* are mounted. Then, the first electrical wire 50 connected to the switch unit 23*a* is passed into the handlebar 15 through the through hole, and drawn out from the end surface of the handlebar 15. Similarly, the second electrical wiring 51 connected to the second control unit 31 is passed into the handlebar 15 through the through hole, and drawn out from the end surface of the handlebar 15. Then, core wires are exposed of the cords 50*a* to 50*c* and 51*a* to 51*c* of the first and second electrical wirings 50 and 51 drawn out, the first connection terminal 61 is crimped to the cords 50*a* to 50*c* of the first electrical wiring 50, and the second connection terminal 62 is crimped to the cords 51*a* to 51*c* of the second electrical wiring 51. Then, the cover member 63 before heat shrinkage is mounted to any of the cords to connect the connection terminals 61 and 62. After the connection, the connection terminals 61 and 62 and the connection portions of the cords are covered with the cover member 63. Then, the hot air is used to cause the cover member 63 to shrink with heat along the shape of the connection terminals and the cords and come into close contact with outer diameters thereof. Finally, the electrical wirings connected are accommodated in the handlebar 15, and the grips 17 are mounted to the handlebar 15 to finish the wiring.

Here, the heat-shrinkable synthetic resin cover member covers at least both the connection terminals. Thus, the connected connection terminals are covered with the cover member and heated to allow the cover member to shrink substantially along the shape of the connection terminals. This facilitates providing a waterproof structure and prevents poor insulation or falling off of the wirings.

The first and second electrical wirings 50 and 51 are previously connected to the switch unit 23*a* and the second control unit 31, and then drawn out of the handlebar 15 that constitutes the frame 1 from the positions to which the switch unit 23*a* and the second control unit 31 are mounted through the inside of the handlebar 15, and the two first electrical wirings 50 and 51 drawn out are connected using the first and second connection terminals 61 and 62, and then accommodated in the handlebar 15, thereby facilitating the insertion of the electrical wirings into the handlebar 15. At this time, both the connection terminals 61 and 62 are covered with the heat-shrinking synthetic resin cover member 63, thereby maintaining insulation and waterproof properties and preventing the connection terminals 61 and 62 or the electrical wirings 50 and 51 from being detached. It will be understood by those skilled in the art that the steps above can be performed in any order.

Other Preferred Embodiments (a) In the above described embodiment, the switch unit 23*a* and the second control unit 31 mounted to the handlebar 15 are illustrated as the electrical components mounted to the frame, but an electrical component connected to the wiring connection structure according to the present invention may be of any type as long as the electrical component is mountable to the frame.

(b) In the above described embodiment, the connection terminals connected by the male and female fitting are illustrated, but a connection structure of the connection terminals is not limited to the male and female fitting. For example, a structure with connection terminals being connected by a screw or caulking may be used. The connection structure of the connection terminal to the electrical wiring is not limited to the crimp, but a connection structure by a screw or soldering may be used (all referred to generally as a first and second attachment portions).

What is claimed is:

1. A method of electrically connecting a first electrical wiring connected to a first electrical component and a second electrical wiring connected to a second electrical component, wherein the first and second electrical wirings each include at least one core wire, the method comprising the following steps:
    a. providing a bicycle handlebar,
    b. inserting the first electrical wiring into the handlebar through a hole,
    c. maneuvering the first electrical wiring out of an open end of the handlebar,
    d. inserting the second electrical wiring into the handlebar through a hole,
    e. maneuvering the second electrical wiring out of an open end of the handlebar,
    f. connecting a first connection terminal to the first electrical wiring,
    g. connecting a second connection terminal to the second electrical wiring,
    h. placing a cover member on either the first or second electrical wiring,
    i. connecting the first and second connection terminals,
    j. heat shrinking the cover member around the first and second connection terminals,
    k. pushing the connected first and second electrical wirings into the handlebar, and
    l. placing a grip on the handlebar.

2. The method of claim 1 further comprising the steps of
    a. exposing the ends of the core wires of the first and second electrical wirings,
    b. crimping the first connection terminal to the at least one core wire of the first electrical wiring, and
    c. crimping the second connection terminal to the at least one core wire of the second electrical wiring.

3. The method of claim 1 wherein the cover member covers at least both of the first and second connection terminals.

4. The method of claim 1 further comprising the step of attaching the first and second electrical components to the handlebar.

5. The method of claim 4 wherein the first electrical component is a switch unit and the second electrical component is a control unit.

6. The method of claim 1 wherein the cover member is comprised of a heat-shrinkable synthetic resin and is tubular.

7. The method of claim 6 wherein the cover member is made of transparent polyolefin resin.

* * * * *